(12) United States Patent
Itami et al.

(10) Patent No.: US 6,778,203 B2
(45) Date of Patent: Aug. 17, 2004

(54) DYNAMIC PRESSURE, AIR BEARING TYPE POLYGONAL SCANNER AND METHOD OF PRODUCING THE SAME

(75) Inventors: Yukio Itami, Yokohama (JP); Mitsuo Suzuki, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 159 days.

(21) Appl. No.: 10/096,250

(22) Filed: Mar. 13, 2002

(65) Prior Publication Data

US 2002/0130948 A1 Sep. 19, 2002

(30) Foreign Application Priority Data

Mar. 14, 2001 (JP) .......................................... 2001-073037
Jul. 23, 2001 (JP) .......................................... 2001-222181

(51) Int. Cl.⁷ .............................. B41J 2/47; B01D 15/14; G02B 26/00; G02B 27/00
(52) U.S. Cl. ....................................................... 347/243
(58) Field of Search ................................. 347/243, 241, 347/239, 238, 237, 260, 259, 258, 256, 252, 251, 255, 247, 257, 242, 225, 261; 399/200–202

(56) References Cited

U.S. PATENT DOCUMENTS

| | | |
|---|---|---|
| 4,726,640 A | 2/1988 | Iwama et al. |
| 5,069,515 A | 12/1991 | Itami et al. |
| 5,453,650 A | 9/1995 | Hashimoto et al. |
| 5,508,477 A | 4/1996 | Kato et al. |
| 5,510,664 A | 4/1996 | Suzuki et al. |
| 5,574,591 A | 11/1996 | Suzuki et al. |
| 5,606,448 A | 2/1997 | Suzuki et al. |
| 5,612,599 A | 3/1997 | Itami et al. |
| 5,642,150 A * | 6/1997 | Takahashi .................... 347/257 |
| 5,726,699 A | 3/1998 | Itami et al. |
| 5,739,602 A | 4/1998 | Suzuki et al. |
| 5,769,544 A | 6/1998 | Suzuki et al. |
| 5,909,966 A | 6/1999 | Suzuki et al. |
| 5,969,844 A | 10/1999 | Itami et al. |
| 6,150,779 A | 11/2000 | Itami et al. |
| 6,215,974 B1 | 4/2001 | Katoh et al. |
| 6,281,609 B1 | 8/2001 | Itami et al. |
| 6,465,918 B1 | 10/2002 | Itami et al. |

* cited by examiner

Primary Examiner—Raquel Yvette Gordon
(74) Attorney, Agent, or Firm—Oblon, Spivak, McClelland, Maier & Neustadt, P.C.

(57) ABSTRACT

A polygonal scanner of the present invention includes a rotary body including a ceramic rotary sleeve and a metallic cylindrical member shrinkage-fitted on the rotary sleeve. The cylindrical member is formed with mirror surfaces constituting a polygonal mirror. A dynamic pressure, air bearing supports the rotary body. The mirror surfaces overlap the rotary sleeve in the axial direction of the rotary sleeve. A hole greater in diameter than the dynamic pressure, air bearing is formed in the top wall of the cylindrical member. The cylindrical member includes a stress removing portion positioned between the mirror surfaces and the rotary sleeve for removing a stress ascribable to shrinkage-fitting.

25 Claims, 8 Drawing Sheets

DYNAMIC PRESSURE, AIR BEARING TYPE POLYGONAL SCANNER AND METHOD OF PRODUCING THE SAME

BACKGROUND OF THE INVENTION

1. Field of the Invention

The present invention relates to a dynamic pressure, air bearing type polygonal scanner rotatable at high speed in a hermetically closed space and a method of producing the same.

2. Description of the Background Art

Today, a digital copier, laser printer or similar electrophotographic recording apparatus with laser optics is extensively used because of high image quality, high-speed printing and low noise as well as cost reduction. The laser optics includes a polygonal scanner. The prerequisite with the polygonal scanner is that it can rotate at a speed matching with the printing speed and pixel density of the recording apparatus.

More specifically, the polygonal scanner is required to rotate at a speed as high as 20,000 rpm (revolutions per minute) to meet the increasing demand for high-speed printing and high pixel density. Such high-speed rotation is not practical with a traditional ball bearing type polygonal scanner because of limited service life and noise particular thereto. A dynamic pressure, air bearing type polygonal mirror is a substitute for the ball bearing type polygonal scanner and configured to meet the above demand.

Japanese Patent Laid-Open Publication No. 7-190047, for example, proposes a high-speed rotary body for a dynamic pressure, air bearing. The rotary body is configured to maintain a preselected rotation speed from the beginning of rotation and preserve high rotation accuracy up to ambient temperature for use. Specifically, the rotary body includes a stationary ceramic shaft and a ceramic sleeve constituting a dynamic pressure, air bearing together with the shaft. The sleeve has uniform thickness in the radial direction thereof. A metallic, hollow cylindrical member is shrinkage-fitted on the outer periphery of the sleeve and has a greater coefficient of linear expansion than the sleeve. After the cylindrical member has been shrinkage-fitted on the sleeve, the inner periphery of the sleeve is machined in a hand-drum shape.

A centrifugal stress acts on the sleeve in the radial direction due to the rotation speed of the rotary body. In addition, a compression stress acts on the sleeve due to the shrinkage-fitting although it is reduced by thermal expansion due to friction. The hand-drum shape of the sleeve is so determined as to maintain a gap between the stationary shaft and the sleeve uniform in accordance with the above stresses.

The high-speed rotary body described above has the following problems left unsolved. When a polygonal mirror with finished mirror surfaces is press-fitted on the sleeve, the mirror surfaces are distorted due to the compression stress. The distortion degrades the flatness of each mirror surface. Even if the mirror surfaces are machined after the shrinkage-fitting, temperature elevation of the rotary body during high-speed rotation cancels the compression stress because the sleeve has a smaller coefficient of linear expansion than the cylindrical member. As a result, the mirror surfaces are again distorted, bringing about the same problem.

In light of the above, the polygonal mirror may be positioned at a higher level than the top of the sleeve in the axial direction, so that the compression stress ascribable to the shrinkage-fitting does will not be transferred to the mirror surfaces. This, however, makes it impossible to locate the polygonal mirror at a lower level than the top of the sleeve and thereby limits the position of the mirror in the axial direction in the optical layout of laser optics.

Another problem with the high-speed rotary body is that machining oil remains between the sleeve and the cylindrical member. The machining oil flows out during rotation and smears the polygonal mirror, a piece of glass and other optical parts.

The rotary body may have its center of gravity located at the center of the dynamic pressure bearing in the axial direction in order to reduce the unbalanced oscillation of the rotary body. In this case, however, when the polygonal mirror is positioned at a higher level than the top of the sleeve, the center of gravity of the rotary body concentrates on the top of the sleeve.

SUMMARY OF THE INVENTION

It is an object of the present invention to provide a dynamic pressure, air bearing type polygonal mirror capable of solving the problems discussed above, and a method of producing the same.

A polygonal scanner of the present invention includes a rotary body including a ceramic rotary sleeve and a metallic cylindrical member shrinkage-fitted on the rotary sleeve. The cylindrical member is formed with mirror surfaces constituting a polygonal mirror. A dynamic pressure, air bearing supports the rotary body. The mirror surfaces overlap the rotary sleeve in the axial direction of the rotary sleeve. A hole greater in diameter than the dynamic pressure, air bearing is formed in the top wall of the cylindrical member. The cylindrical member includes a stress removing portion positioned between the mirror surfaces and the rotary sleeve for removing a stress ascribable to shrinkage-fitting.

A method of producing the above polygonal scanner is also disclosed.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Preferred embodiments of the dynamic pressure, air bearing type polygonal scanner in accordance with the present invention will be described hereinafter.

First Embodiment

Figure 1:
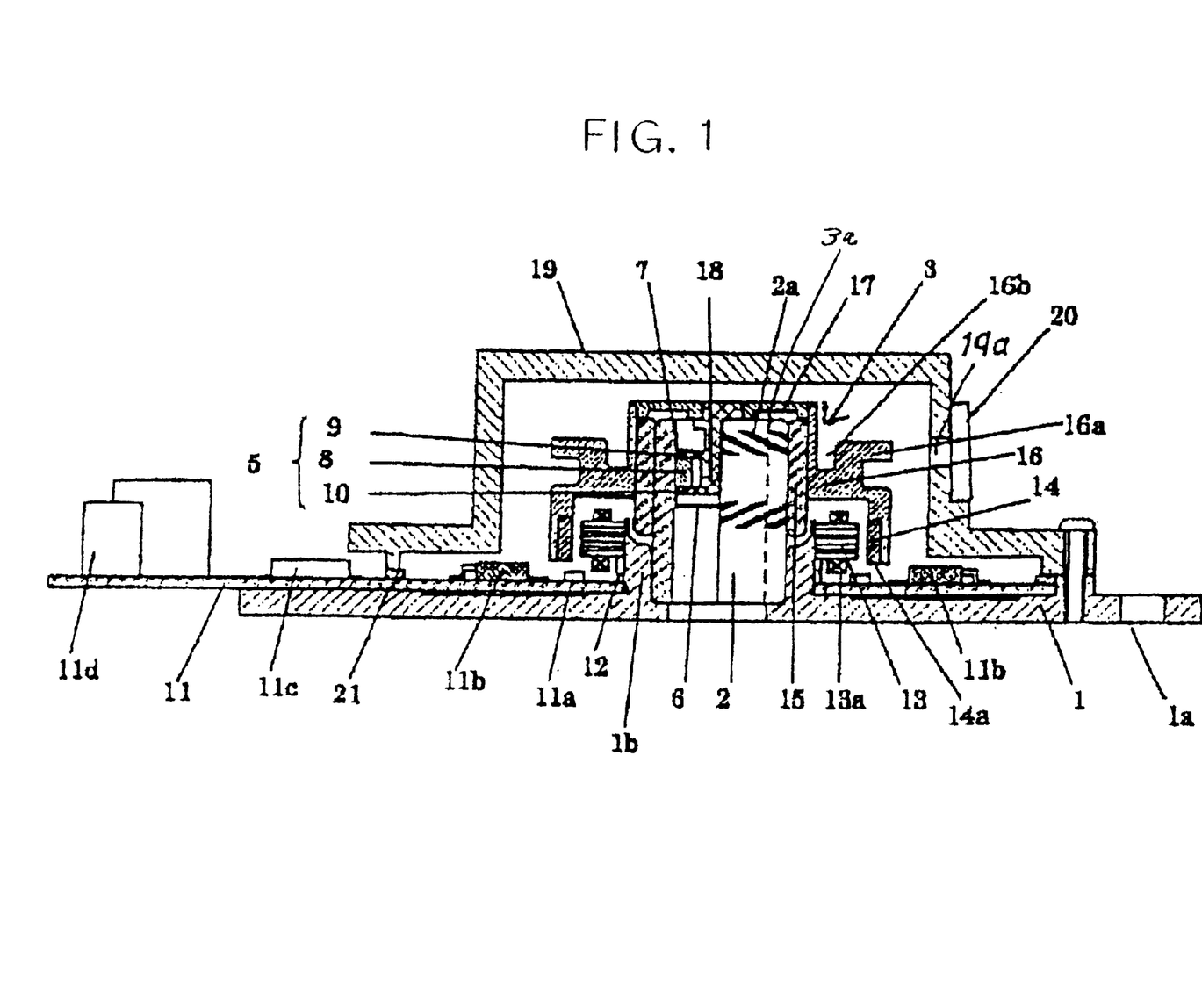
FIG. 1 is a section showing a first embodiment of the dynamic pressure, air bearing type polygonal scanner in accordance with the present invention.
Figure 2:
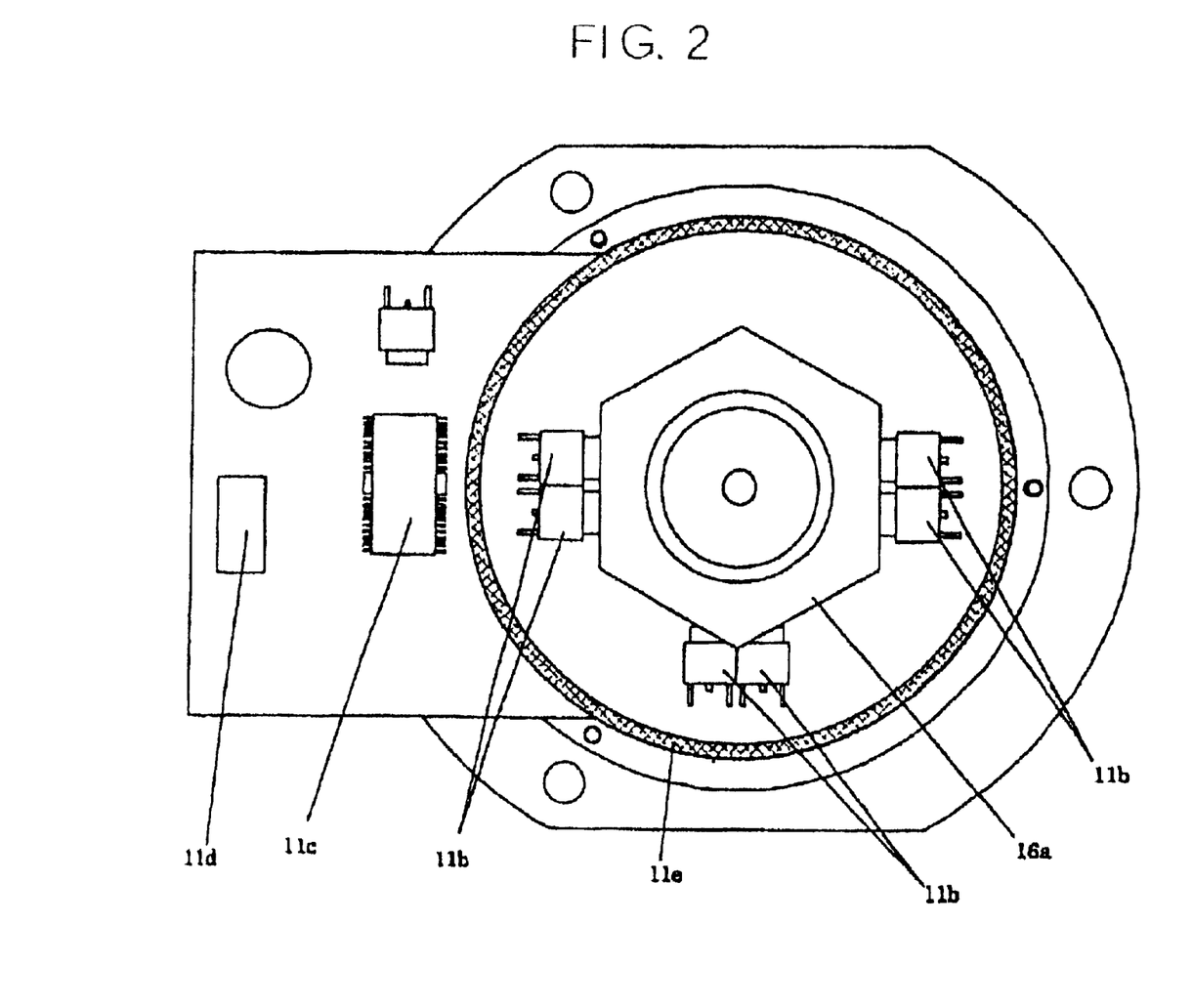
FIG. 2 is a plan view showing the illustrative embodiment with a cover removed.
Figure 3:
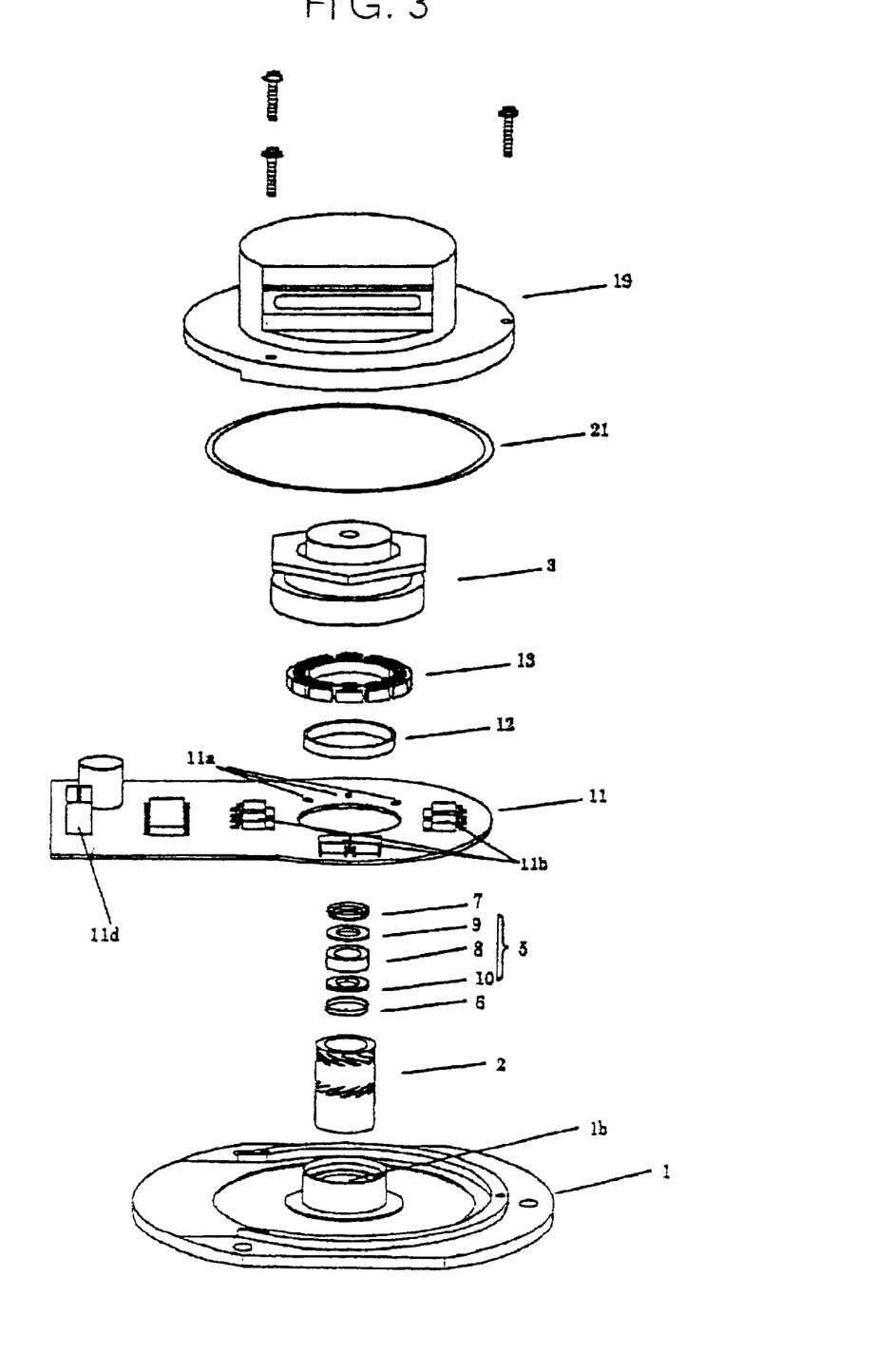
FIG. 3 is an exploded perspective view showing a rotary body included in the illustrative embodiment.

Referring to FIGS. 1 through 3, a dynamic pressure, air bearing type polygonal scanner embodying the present invention is shown. As shown, the polygonal scanner includes a housing 1 having an upper surface and a lower surface. The upper surface constitutes a reference surface 1a for mounting the housing 1 to an optics housing not shown. A bearing mount portion 1b extends upward from the upper surface of the housing 1. A hollow cylindrical shaft 2 is affixed to the bearing mount portion 1b, constituting a dynamic pressure air bearing. Grooves 2a are formed in the outer periphery of the shaft 2. A rotary body 3 is coupled over the shaft 2.

When the rotary body 3 starts rotating, air pressure in a bearing gap between the shaft 2 and a rotary sleeve 15 rises. The shaft 2 therefore supports the rotary body 3 in the radial direction without contacting it. A suction type magnetic bearing includes an affixing portion 5 affixed to the inner periphery of the shaft 2. More specifically, a cap member 6 and a stop 7 are press-fitted in the bore of the shaft 2 in order to affix the affixing portion 5 therebetween in the axial direction of the shaft 2.

Holes whose diameter is as small as 0.2 mm to 0.5 mm are formed in the center portion of the cap member 6. Using viscous drag derived from the flow of air, the holes attenuate the oscillation of the cap member 6 in the up-and-down direction. The cap member 6 and stop 7 both are formed of stainless steel or similar nonmagnetic material.

The affixing portion 5 includes an annular permanent magnet 8, a first flat stationary yoke 9, and a second flat stationary yoke 10. The annular permanent magnet 8 is magnetized to two polarities in the direction of the axis of rotation. The first stationary yoke 9 is formed of a ferromagnetic material and formed with a center hole smaller in diameter than the hole of the permanent magnet 8. The second stationary yoke 10 is also formed of a ferromagnetic material and is formed with a center hole smaller in diameter than the hole of the permanent magnet 8.

The two yokes 9 and 10 sandwich the permanent magnet 8 in the axial direction with their center holes aligning with each other in the direction of axis of rotation. The permanent magnet 8 is mainly formed of a rare earth material. The yokes 9 and 10 are formed of steel. The stationary shaft 2 is formed of ceramics, aluminum alloy or similar nonmagnetic material.

A printed circuit board 11 is formed with a hole substantially at its center and mounted on the upper surface of the housing 1. The printed circuit board 11, a spacer 12 and a stator core 13 with motor windings 13a are sequentially coupled over the bearing mount portion 1b of the housing 1 in this order. The top of the bearing mount portion 1b is plastically deformed to fix the three members 11, 12 and 13 in place.

Rotor magnets 14 are mounted on the rotary body 3. The rotor magnets 14 and stator core 13 with the motor windings 13 face each other in the direction perpendicular to the axis of rotation, constituting a radial gap, outer rotor type brushless motor.

The rotary sleeve 15 is formed of ceramics. The rotary body 3 includes a hollow cylindrical member 16 formed of metal whose major component is aluminum. The cylindrical member 16 is shrinkage-fitted on the outer periphery of the sleeve 15. A polygonal mirror portion 16a is formed integrally with the cylindrical member 16. The rotor magnets 14 are adhered to or press-fitted on the lower portion of the cylindrical member 16. The top wall of the cylindrical member 16 is formed with a hole greater in diameter than the diameter of the dynamic pressure bearing.

The sleeve 15 and cylindrical member 16 are produced by four consecutive steps, i.e., a first step of shrinkage-fitting the cylindrical member 16 on the sleeve 15, a second step of machining the inner periphery of the sleeve 15, a third step of machining the reference surface of the cylindrical member 16 for forming mirror surfaces, and a fourth step of finishing the mirror surfaces.

More specifically, in the first step, when the cylindrical member 16 is shrinkage-fitted on the sleeve 15, the inner periphery of the sleeve 15 expected to play the role of a dynamic pressure, air bearing surface deforms. In the second step, the inner periphery of the sleeve 15 is machined to correct the deformed inner diameter. At this instant, the hole of the cylindrical member 16 greater in diameter than the diameter of the dynamic pressure bearing allows a tool to be easily passed therethrough, facilitating the above correction.

Figure 6:
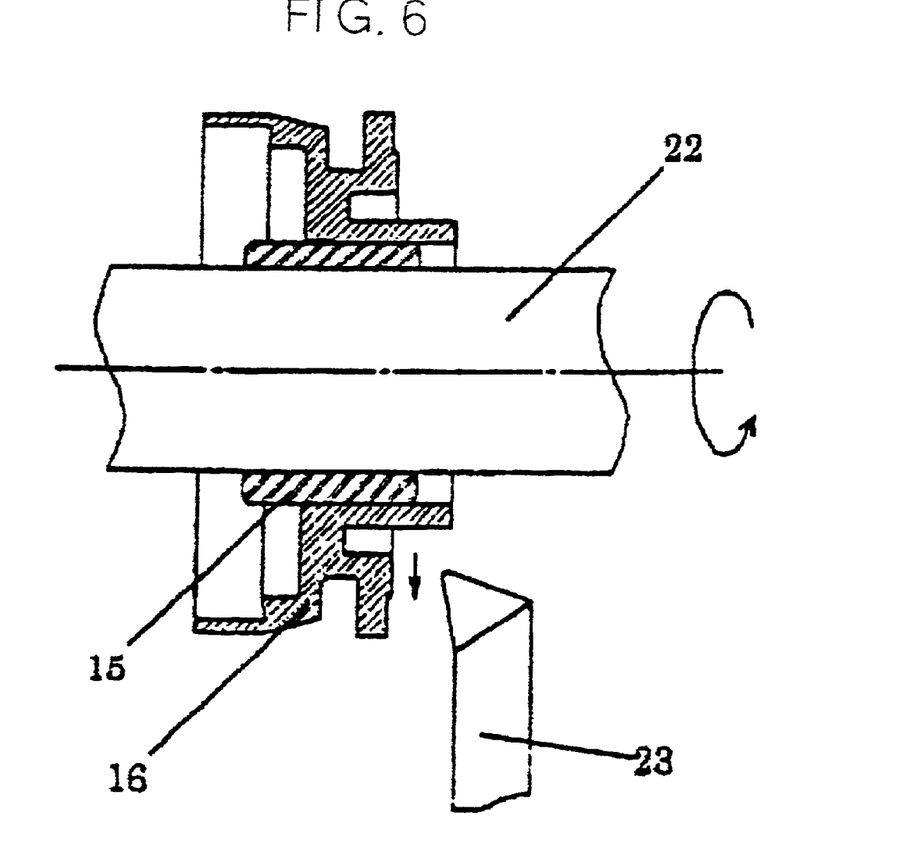
FIG. 6 demonstrates how a reference surface is machined in the second embodiment.

In the third step, the cylindrical member 16 is formed with the reference surface for forming mirror surfaces. As shown in FIG. 6, a jig or tapered rod 22 is also passed through the hole of the cylindrical member to thereby fix the sleeve 15 in place. In this condition, the cylindrical member 16 can be easily machined to form the reference surface. In FIG. 6, the reference numeral 23 designates a machining tool.

In the fourth step, the cylindrical member 16 affixed to the sleeve 15 is fixed in place at its reference surface. The cylindrical member 16 is then machined to form mirror surfaces. Consequently, the mirror surfaces are accurately formed at an accurate angle with respect to the axis of the sleeve 15.

Figure 7:
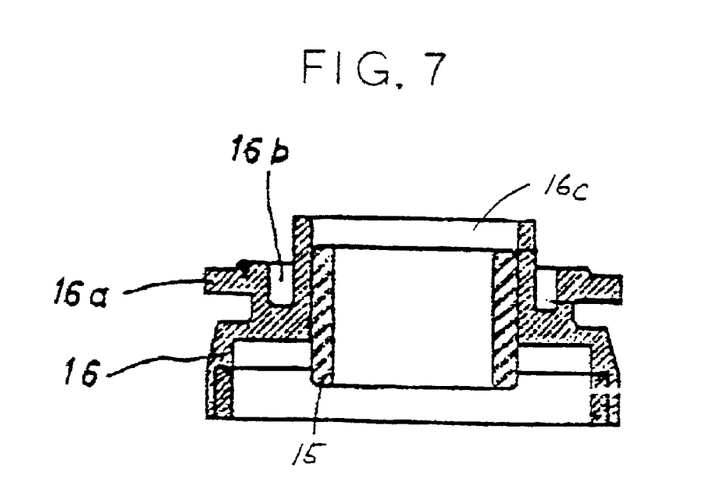
FIG. 7 shows how a rotary sleeve, mirrors and an annular groove overlap each other in the second embodiment.

FIG. 7 shows how the sleeve 15, mirror surfaces 16a and an annular groove 16b overlap each other in the axial direction of the sleeve 16. As shown, the annular groove 16b is formed in the cylindrical member 16 concentrically with the inscribed circle of the mirror surfaces 16a. The annular groove 16b overlaps the mirror surfaces 16a and sleeve 15 in the axial direction of the sleeve 15 (up-and-down direction in FIG. 7).

The sleeve 15 formed of ceramics has a smaller coefficient of linear expansion than the cylindrical member 16. Therefore, when the rotary body 3 is heated due to high-speed rotation, a compression stress ascribable to shrinkage-fit is reduced with the result that the outer periphery of the cylindrical member 16 slightly deforms. At this instant, the annular groove 16b, which overlaps the mirror surfaces 16a and sleeve 15 in the axial direction, prevents the above compression stress from being imparted to the mirror surfaces 16a. The mirror surfaces 16a are therefore free from distortion that would degrade the flatness of the mirror surfaces 16a.

A closure member 17 is press-fitted in the hole, labeled 16c in FIG. 7, formed in the top of the cylindrical member 16. The closure member 17 has substantially the same coefficient of linear expansion as the cylindrical member 16. A rotary portion 18 included in the suction type magnetic bearing is mounted on the closure member 17. The rotary portion 18 has an outer cylindrical surface forming a magnetic gap between it and the center holes of the first and second stationary yokes 9 and 10. The outer cylindrical surface is coaxial with the center of rotation of the rotary portion 18. The rotary portion 18 is implemented as a permanent magnet or is formed of a ferromagnetic material whose major component is steel.

When the rotary member 3 and stationary shaft 2 are assembled together, the closure member 17 press-fitted in the hole of the cylindrical member 16 forms a substantially hermetically closed space 3a between the top of the shaft 2 and the rotary member 3. When air inside the space 3a flows through the fine holes of the cap member 6, the resulting viscous drag attenuates the up-and-down oscillation of the cap member 6, as stated earlier.

The top of the cylindrical member 16 is positioned at a higher level than the top of the sleeve 15. The hole of the cylindrical member 16, inclusive of the portion above the sleeve 15, has a diameter equal to or greater than the outside diameter of the sleeve 15. Machining oil therefore does not remain between the cylindrical member 16 and the sleeve 15 or does not flow out during rotation. The hole of the cylindrical portion 16 may have a diameter equal to the outside diameter of the sleeve 15, i.e., the shrinkage-fit diameter in order to facilitate size control including parts tests.

Even when temperature varies, the closure member 17 having substantially the same coefficient of linear expansion as the cylindrical member 16 expands or contracts in the same manner as the cylindrical member 16. This prevents the portions of the closure member 17 and cylindrical member 16 connected together from loosening; otherwise, the rotary body 3 would be brought out of balance due to temperature variation and would thereby amplify the oscillation.

The annular groove 16b of the cylindrical member 16 is used to correct the unbalance of the rotary body 3. More specifically, the groove or upper correction surface 16b and a lower correction surface 14a positioned on the rotary body 3 reduce unbalanced oscillation to an extremely low level. The groove 16b therefore makes it needless to form an exclusive groove for balance correction.

A cover 19 is positioned above the housing 1 and printed circuit board 11 in such a manner as to surround the rotary body 3 and is fastened to the housing 1 by screws. A hole 19a is formed in the cover 19 for emitting a laser beam to the outside. A piece of glass 20 is adhered to the edges of the hole 19a by a two-sided adhesive tape or adhesive. An elastic seal member 21 is compressed between the cover 19 and the printed circuit board 11, hermetically isolating the space accommodating the rotary member 3 from the outside.

More specifically, as shown in FIG. 2, the elastic seal member 21 may be positioned in an annular portion 11e included in the printed circuit board 11 and where circuit elements are not mounted, implementing further hermetic closing the above space. Because the rotary body 3 is confined in such a space, the polygonal mirror agitates a minimum amount of air and therefore reduces a loss ascribable to air streams. This successfully reduces current to flow through a driving device, not shown, for thereby saving power. In addition, hissing sound ascribable to the rotation of the polygonal mirror is confined in the hermetic space, lowering the noise level.

A drive circuit is arranged on the printed circuit board 11 and patterned together with the motor windings 13a and Hall elements 11a. The drive circuit sequentially switches current to the motor winding 13a in accordance with the outputs of the Hall elements 11a responsive to the positions of the rotary body 3, thereby causing the rotary body 3 to rotate at a constant speed. The printed circuit board 11 is a one-sided metallic circuit board. Drive elements 11b and other circuit elements 11c and 11d, as well as the Hall elements 1a, are mounted on the surface of the printed circuit board 11 facing the rotor magnets 14. The reverse surface of the circuit board 11 is affixed to the housing 1, which is formed of an aluminum alloy.

The above configuration increases the thermal capacity of the circuit elements against heating of, e.g., the drive elements 11b and thereby enhances efficient heat radiation. Therefore, use can be made of small size, low cost circuit elements. Further, the one-sided circuit board 11 does not need through-holes and is therefore low cost.

The circuit elements including the drive elements 11b are also confined in the hermetically closed space in which the rotary body 3 is positioned. The rotary body 3 in rotation agitates air inside the space for thereby substantially leveling temperature inside the space. This scatters and radiates heat output from the circuit elements. It follows that the circuit elements are protected from temperature elevation and operable with reliability.

Part of the printed circuit board 11 protrudes to the outside from the position where the housing 1 and cover 19 join each other. A connector 11d is mounted on the protruding part of the circuit board 11 for inputting and outputting signals and feeding power. The connector 11d is positioned at a higher level than the reference surface of the housing 1, so that a harness can be mounted even after the polygonal scanner. In addition, the harness can be easily inserted from above.

As stated above, the illustrative embodiment is constructed integrally inclusive of the cover 19 and therefore small size and compact. In addition, the illustrative embodiment is free from irregular rotation and noise despite high-speed rotation and facilitates tests.

Further, the hermetically closed polygonal scanner is mounted on the optics housing implemented as an aluminum die-casting and including a surface closely contacting the reference surface of the housing 1. In this condition, there is guaranteed a heat radiation path extending from the printed circuit board 11 to the optics housing via the housing 1. It follows that the drive elements 11b and other circuit elements are heated little, insuring reliable operation.

Second Embodiment

Figure 4:
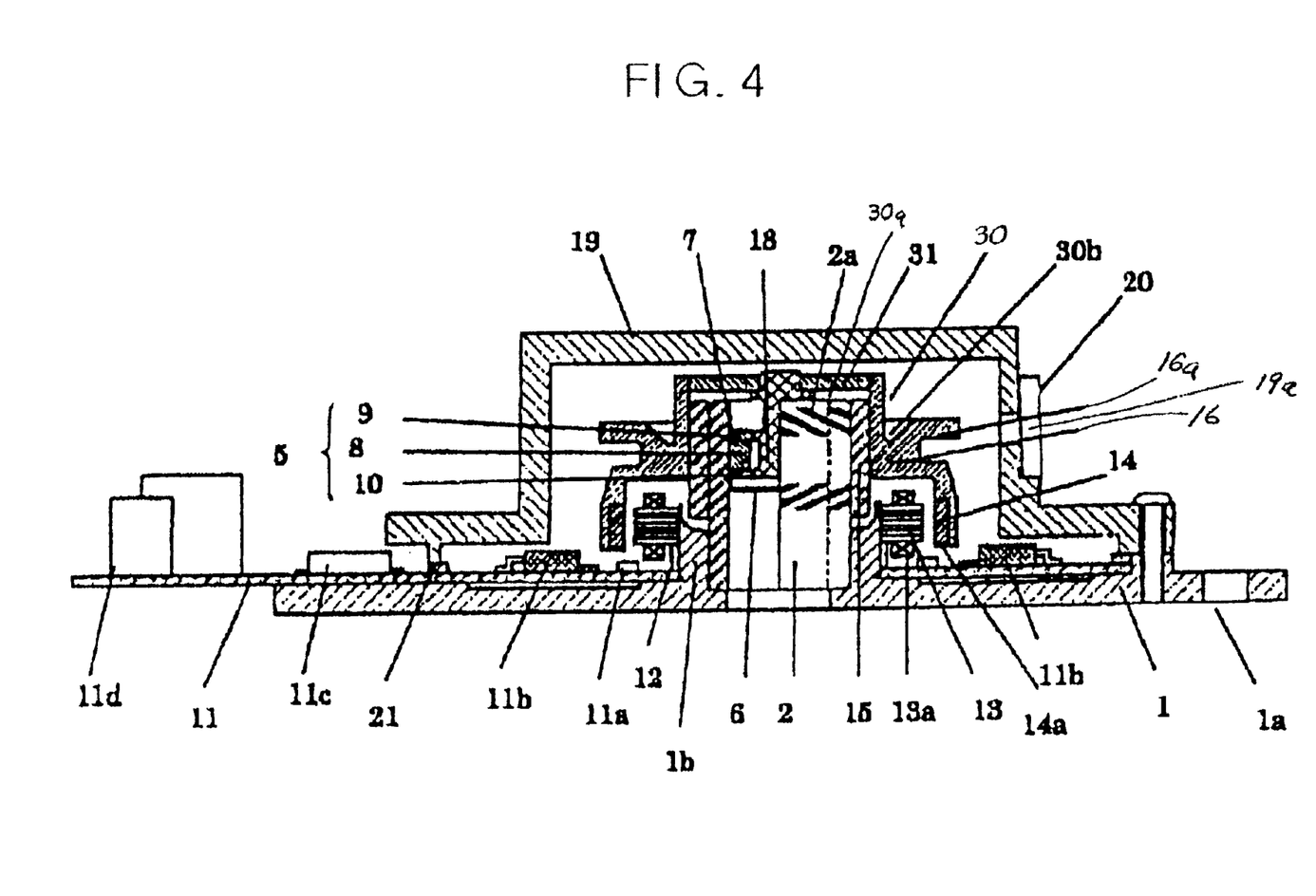
FIG. 4 is a section showing a second embodiment of the present invention.
Figure 5:
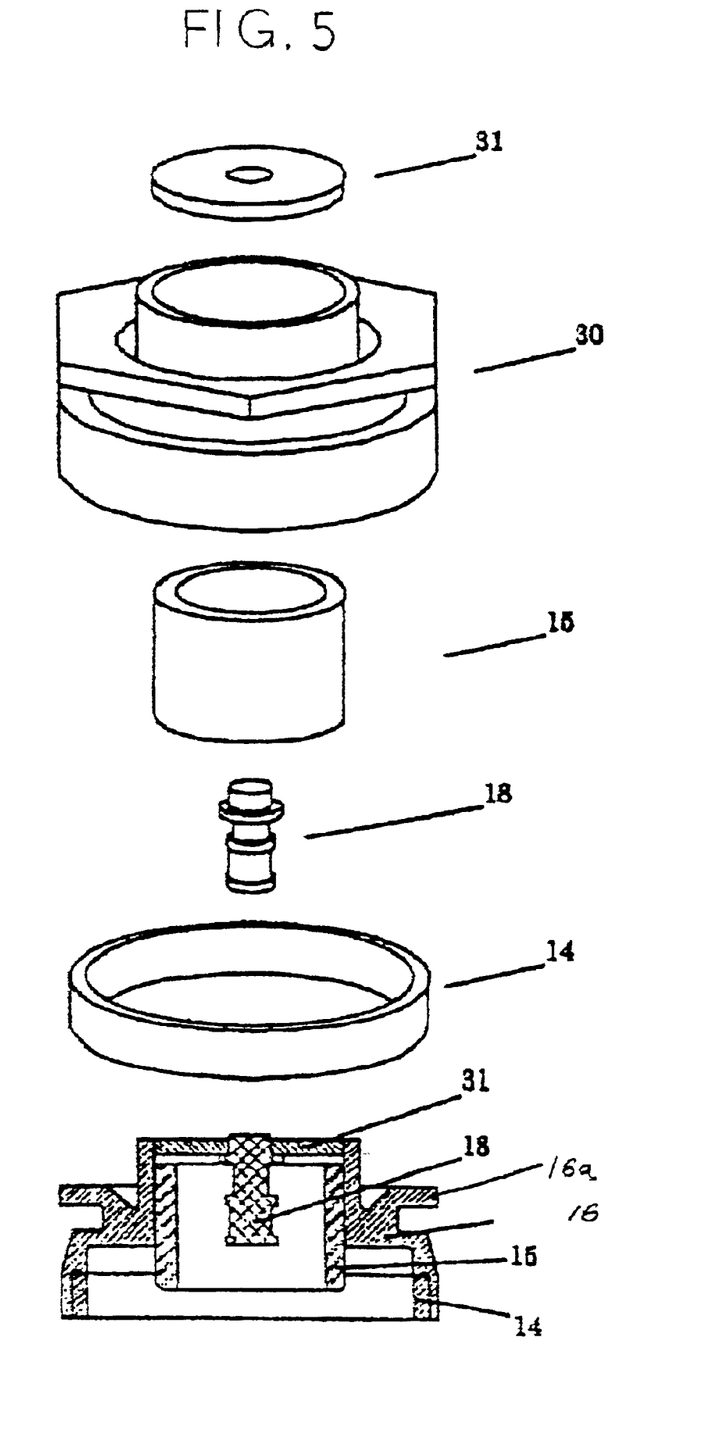
FIG. 5 is an exploded perspective view showing a rotary body included in the second embodiment.

Reference will be made to FIGS. 4 and 5 for describing an alternative embodiment of the present invention. This embodiment is identical with the first embodiment except for the configuration of the rotary body 30. Identical structural elements are designated by identical reference numerals and will not be described in order to avoid redundancy. As shown, an annular groove 30b is formed in a cylindrical member 30 and differs from the annular groove 16b in that it has a generally V-shaped cross-section. The V-shaped groove 30b is easier to form than the groove 16b. Further, a closure member 31 having a flat disk-like configuration is substituted for the closure member 17. The closure member 31 can be easily formed by pressing at low cost by using, e.g., an aluminum alloy.

Third Embodiment

Figure 8:
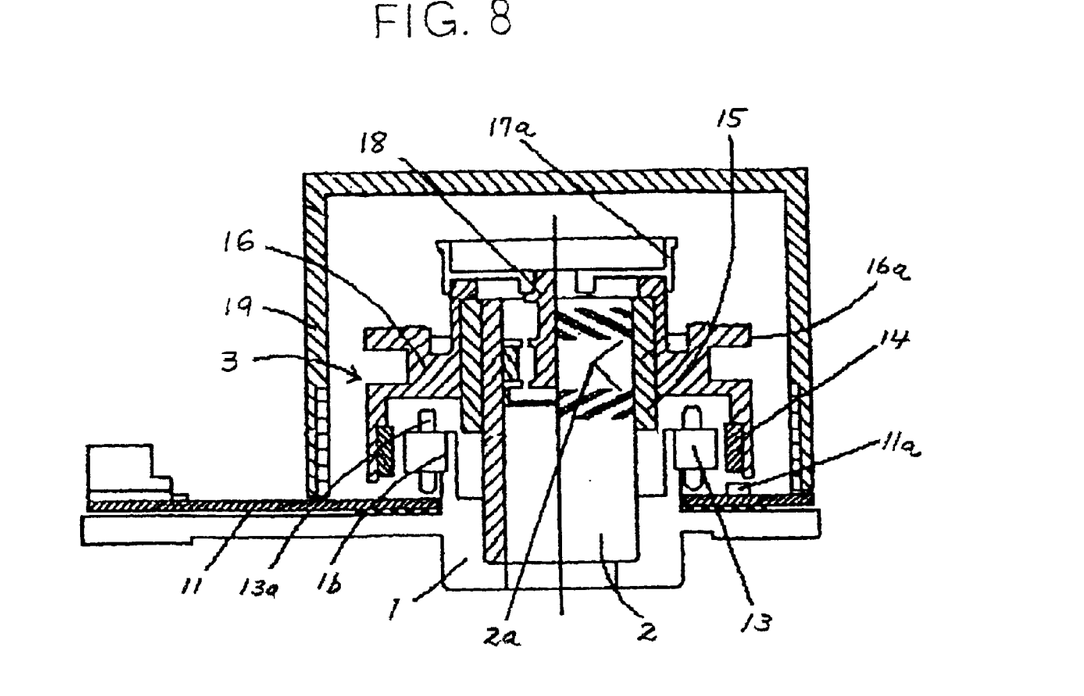
FIG. 8 is a section showing a third embodiment of the present invention.
Figure 9:
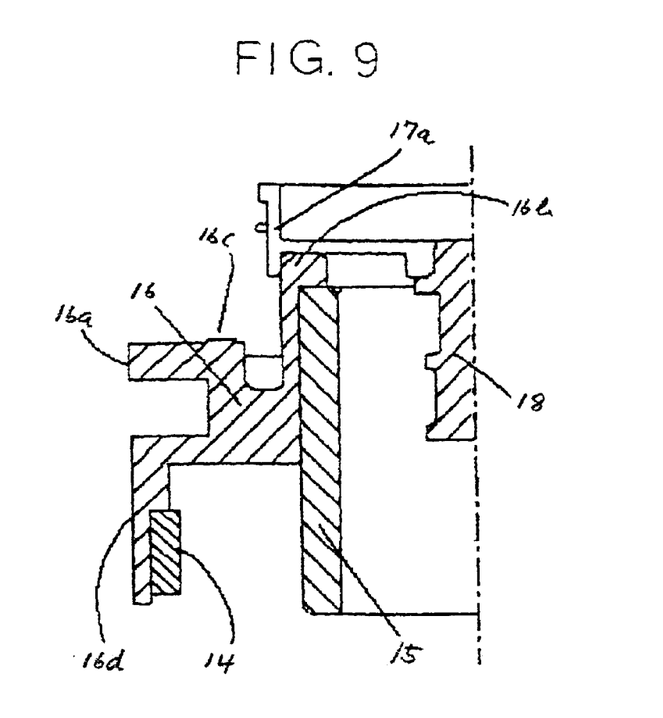
FIG. 9 is a fragmentary enlarged section showing the third embodiment.

A third embodiment of the present invention will be described with reference to FIGS. 8 and 9 hereinafter. In FIGS. 8 and 9, structural elements identical with the structural elements of the previous embodiments are designated by identical reference numerals and will not be described specifically in order to avoid redundancy. As shown, a closure member 17a is affixed to the top of the cylindrical member 16, closing the top opening of the sleeve 15. For example, the closure member 17a may be press-fitted in the top opening of the cylindrical member 16. Alternatively, the closure member 17a may be adhered only to the surface of the protruding portion of the cylindrical member 16 that is perpendicular to the mirror surfaces 16a. Further, the closure member 17a and cylindrical member 16 may be connected together by threaded engagement. The illustrative embodiment uses press-fitting, as will be described hereinafter.

As shown in FIG. 9, the closure member 17a is press-fitted on a portion 16b protruding from the cylindrical member 16. This configuration protects the press-fitted portion from breakage or deterioration ascribable to a difference in thermal expansion. So long as the closure member 17a and cylindrical member 16 are formed of the same material, press-fitting or shrinkage-fitting prevents the affixing force from decreasing even at high temperature, insuring the balance of the rotary body 3. This advantage is achievable even when the closure member 17a and cylindrical member 16 are formed of different materials, only if an adequate shrinkage-fit margin is selected on the basis of the upper temperature limit usable.

The rotary magnet 14, sleeve 15, cylindrical member 16 and rotary portion 18 are also affixed by press-fitting or shrinkage-fitting. Subsequently, the mirror surfaces 16a of the cylindrical member 16 are finished, completing the rotary body 3. If desired, the closure member 17a may be formed with a hole communicating the inside of the sleeve 15 to the outside. Such a hole allows a cleaning liquid to efficiently circulate in the rotary body 3 after the mirror surfaces 16 have been formed. Of course, the constituents of the rotary body 3 each are formed of a material resistive to machining oil and cleaning liquid during the finishing of the mirror surfaces 16a. Particularly, plastics other than metal (rotor magnets) should preferably use an epoxy or a nylon binder or should preferably be plated or otherwise treated.

The mirror surfaces 16a are accurately finished by using the axis of the sleeve 15 or the end face 16c of the cylindrical member 16 as a reference. When the end face 16c is used as a reference, it is necessary to accurately control the deflection of the end face 16c to 5 μm or less with respect to the axis of the sleeve 15. The cylindrical member 16 has an outside diameter 16d slightly smaller than the inscribed circle of the mirrors 16a, so that a machining tool can reach the mirrors 16a without hitting against the outside diameter 16d.

In the illustrative embodiment, even when stresses ascribable to the press-fitting of various parts act on the mirror surfaces 16a, the mirror surfaces 16a are finished later and therefore achieve high accuracy.

The stress ascribable to the press-fitting of the closure member 17a on the portion 16b of the cylindrical member 16 effects the mirror surfaces 16a more than the other stresses, because such a press-fitting portion is close to the mirror surfaces 16a. More specifically, when the closure member 17a is press-fitted on the portion 16b, a stress acts toward the axis of the cylindrical member 16 and causes the mirror surfaces 16a to be distorted in a concave shape. Although the distortion is as small as several hundred nanometers, it effects a printed image and is particularly critical when resolution is as high as 600 dpi (dots per inch) or above. By minimizing the influence of the press-fitting of the closure member 17a on the cylindrical member 16, it is possible to guarantee the accuracy of the mirror surfaces 16a.

More specifically, to minimize the influence of press-fitting, the cylindrical member 16 and closure member 17a both are formed of an aluminum alloy. The press-fitting portion is provided with a diameter between the inside diameter (bearing diameter) of the sleeve 15 and the diameter of the inscribed circle of the mirror surfaces 16a. In addition, an optimal press-fitting margin is selected. Experiments showed that a press-fitting margin of 0.15 mm with respect to diameter aggravated the accuracy of the mirror portions 16a while margins of 0.06 mm and 0.1 mm reduced the aggravation and insured a good jitter characteristic.

Fourth Embodiment

Figure 10:
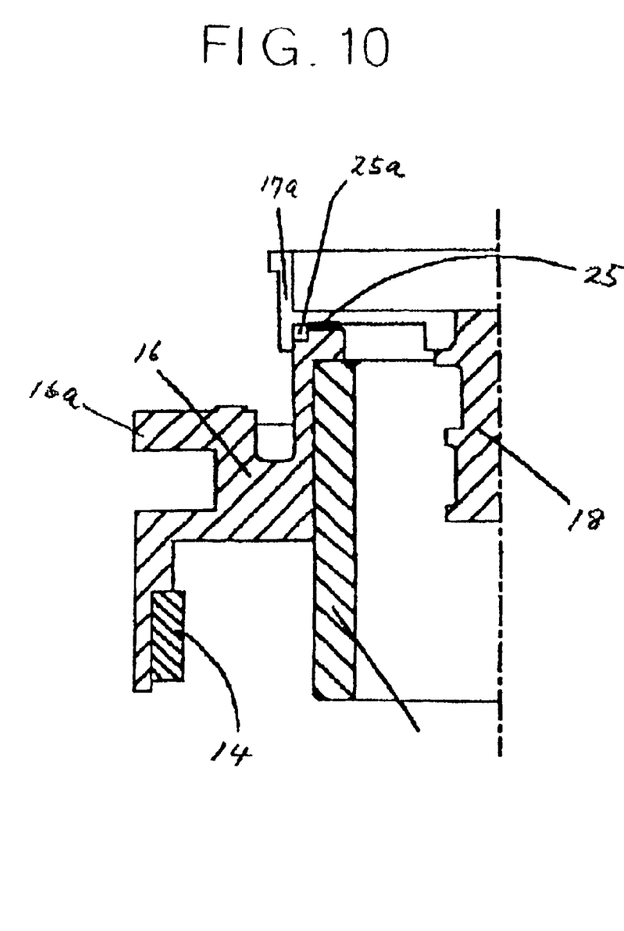
FIG. 10 is a fragmentary enlarged section showing a fourth embodiment of the present invention.

FIG. 10 shows a fourth embodiment of the present invention. The following description will concentrate on the essential portion of the illustrative embodiment. In the illustrative embodiment, the closure member 17a is adhered to the cylindrical member by adhesive instead of being press-fitted on the same. As shown, adhesive 25 (indicated in black) is coated only on the surface of the cylindrical member 16 substantially perpendicular to the mirror surfaces 16a. The closure member 17a is adhered only to the above surface of the cylindrical member 16. The reference numeral 25a designates a recess for preventing the adhesive 25 from flowing inward in the radial direction of the cylindrical member 16.

The adhesive scheme described above obviates the stress ascribable to press-fitting and thereby insures the accurate configuration of the mirror surfaces 16a while maintaining a good jitter characteristic. Moreover, the adhesive 25 intervening between two parts of the same kind obviates a shearing force ascribable to thermal expansion. In addition, any irregularity in the thickness of the adhesive does not generate a stress tending to move the parts in the radial direction. The rotary body 3, not shown, is therefore stably balanced and maintains low oscillation.

Fifth Embodiment

Figure 11:
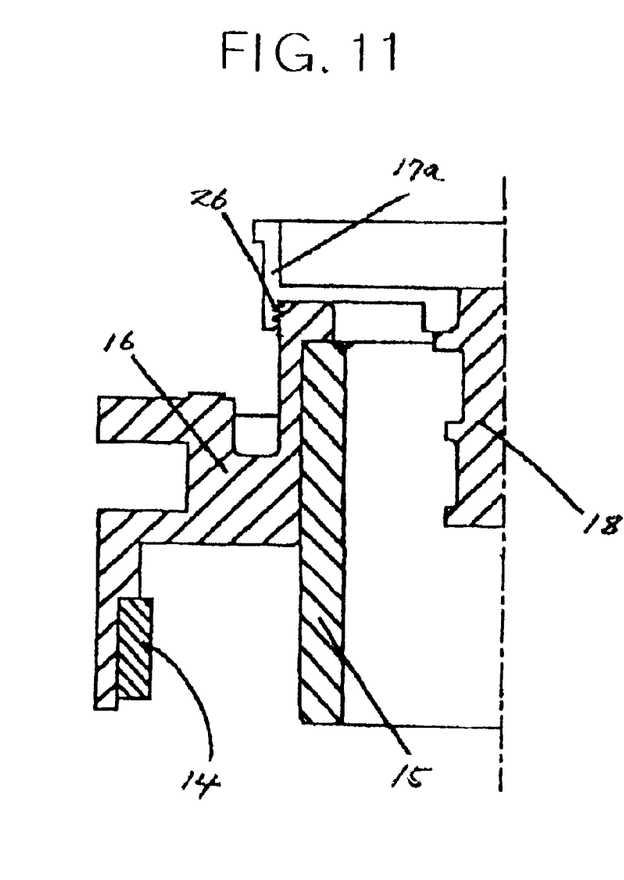
FIG. 11 is a fragmentary enlarged view showing a fifth embodiment of the present invention.

FIG. 11 shows a fifth embodiment of the present invention. The following description will also concentrate on the essential part of the illustrative embodiment. In the illustrative embodiment, the closure member 17a is affixed to the cylindrical member 16 by threaded engagement. As shown, the closure member 17a and cylindrical member 16 are tapped and diced, respectively, and affixed together at a portion 26. It is to be noted that tapping and dicing are effected in a direction that does not loosen the closure member 17a and cylindrical member 16 during rotation of the rotary member not shown.

In the illustrative embodiment, the threaded portion 26 is free from a stress ascribable to a difference in thermal expansion and is not loosened even at high temperature. The rotary body 3 therefore stably remains in balance and maintains low oscillation.

In summary, it will be seen that the present invention provides a dynamic pressure, air bearing type polygonal scanner having various unprecedented advantages, as enumerated below.

(1) Even when the compression stress of a shrinkage-fitted portion varies due to high-speed rotation or temperature variation, mirror surfaces are free from distortion. The mirror surfaces therefore maintain expected flatness with high accuracy.

(2) The mirror portion does not have to be positioned at a higher level than the top of a sleeve, which is formed of ceramics, but can overlap the sleeve in the axial direction.

(3) A rotary body has a center of gravity not concentrating on the upper end side of the sleeve, but positioned at the center of a dynamic pressure, air bearing in the axial direction. This frees the rotary body from noticeable unbalanced oscillation.

(4) After shrinkage-fitting, there can be easily machined the inside of the sleeve and a reference surface used to form mirrors.

(5) The air bearing formed of ceramics is low in oscillation and noise and long life.

(6) Machining oil does not remain between the sleeve and a cylindrical member formed of metal, so that the assembly is easy to clean after machining.

(7) A closure member is not loosened despite temperature variation, preventing balance and oscillation from varying.

(8) The rotary body remains well balanced even when temperature is high during high-speed rotation.

(9) The rotary body is light weight and can sharply start rotating at high speed.

(10) An exclusive groove for balance correction is not necessary, so that the assembly is simple in structure and low cost.

Various modifications will become possible for those skilled in the art after receiving the teachings of the present disclosure without departing from the scope thereof.

What is claimed is:

1. A polygonal scanner comprising:
   a rotary body comprising a ceramic rotary sleeve and a metallic cylindrical member shrinkage-fitted on said rotary sleeve, a surface of said cylindrical member being mirrored to constitute a polygonal mirror; and
   a dynamic pressure, air bearing for supporting said rotary body;
   wherein said mirrored surfaces overlap said rotary sleeve in an axial direction of said rotary sleeve;
   a hole greater in diameter than said dynamic pressure, air bearing is formed in a top wall of said cylindrical member, and
   said cylindrical member comprises a stress removing portion positioned between said mirrored surfaces and said rotary sleeve for removing a stress ascribable to shrinkage-fitting.

2. The scanner as claimed in claim 1, wherein said stress removing portion comprises an annular groove concentric with an inscribed circle of said mirrored surfaces and overlapping said mirrored surfaces in the axial direction.

3. The scanner as claimed in claim 2, wherein said hole of said cylindrical member has a diameter substantially equal to or greater than an outside diameter of said rotary sleeve.

4. The scanner as claimed in claim 3, wherein said cylindrical member includes a protruding portion protruding above said rotary sleeve,
   a closure member substantially identical in a coefficient of linear expansion as said cylindrical member is affixed to said protruding portion, and
   a magnetic bearing supporting said rotary body in the axial direction includes a rotary portion affixed to said closure member.

5. The scanner as claimed in claim 4, wherein said closure member is press-fitted in an open end of said cylindrical member.

6. The scanner as claimed in claim 4, wherein said closure member is adhered to said cylindrical member only at a surface of said cylindrical member perpendicular to said mirrored surfaces.

7. The scanner as claimed in claim 4, wherein said closure member and said cylindrical member are affixed to each other by being screw-threaded in opposite directions to each other.

8. The scanner as claimed in claim 4, wherein said cylindrical member is formed of metal whose major component is aluminum.

9. The scanner as claimed in claim 2, wherein a balance correcting member is added to said annular groove.

10. The scanner as claimed in claim 1, wherein said hole of said cylindrical member has a diameter substantially equal to or greater than an outside diameter of said rotary sleeve.

11. The scanner as claimed in claim 10, wherein said cylindrical member includes a protruding portion protruding above said rotary sleeve,
    a closure member substantially identical in a coefficient of linear expansion as said cylindrical member is affixed to said protruding portion, and
    a magnetic bearing supporting said rotary body in the axial direction includes a rotary portion affixed to said closure member.

12. The scanner as claimed in claim 11, wherein said closure member is press-fitted in an open end of said cylindrical member.

13. The scanner as claimed in claim 11, wherein said closure member is adhered to said cylindrical member only at a surface of said cylindrical member perpendicular to said mirrored surfaces.

14. The scanner as claimed in claim 11, wherein said closure member and said cylindrical member are affixed to each other by being screw-threaded in opposite directions to each other.

15. The scanner as claimed in claim 11, wherein said cylindrical member is formed of metal whose major component is aluminum.

16. The scanner as claimed in claim 10, wherein a balance correcting member is added to said annular groove.

17. The scanner as claimed in claim 1, wherein said cylindrical member includes a protruding portion protruding above said rotary sleeve,
    a closure member substantially identical in a coefficient of linear expansion as said cylindrical member is affixed to said protruding portion, and
    a magnetic bearing supporting said rotary body in the axial direction includes a rotary portion affixed to said closure member.

18. The scanner as claimed in claim 17, wherein said closure member is press-fitted in an open end of said cylindrical member.

19. The scanner as claimed in claim 17, wherein said closure member is adhered to said cylindrical member only at a surface of said cylindrical member perpendicular to said mirrored surfaces.

20. The scanner as claimed in claim 17, wherein said closure member and said cylindrical member are affixed to each other by being screw-threaded in opposite directions to each other.

21. The scanner as claimed in claim 17, wherein said cylindrical member is formed of metal whose major component is aluminum.

22. The scanner as claimed in claim 17, wherein a balance correcting member is added to said annular groove.

23. The scanner as claimed in claim 1, wherein said cylindrical member is formed of metal whose major component is aluminum.

24. A method of machining a polygonal scanner comprising:
- a rotary body comprising a ceramic rotary sleeve and a metallic cylindrical member shrinkage-fitted on said rotary sleeve, a surface of said cylindrical member being mirrored to constitute a polygonal mirror; and
- a dynamic pressure, air bearing for supporting said rotary body;
- wherein said mirrored surfaces overlap said rotary sleeve in an axial direction of said rotary sleeve;
- a hole greater in diameter than said dynamic pressure, air bearing is formed in a top wall of said cylindrical member, and
- said cylindrical member comprises a stress removing portion positioned between said mirrored surfaces and said rotary sleeve for removing a stress ascribable to shrinkage-fitting;

said method comprising the steps of:
- (a) affixing said rotary sleeve and said cylindrical member by shrinkage-fitting;
- (b) machining an inside diameter of said rotary sleeve;
- (c) machining a reference surface for forming said mirrored surfaces; and
- (d) finishing said mirrored surfaces.

25. The method as claimed in claim 24, further comprising (e) press-fitting, before step (c) or (d), a closure member in an open end of said rotary sleeve.

* * * * *